No. 766,218. PATENTED AUG. 2, 1904.
J. A. CHARTER.
VEHICLE CONTROLLING MECHANISM.
APPLICATION FILED JUNE 18, 1903.
NO MODEL. 5 SHEETS—SHEET 4.

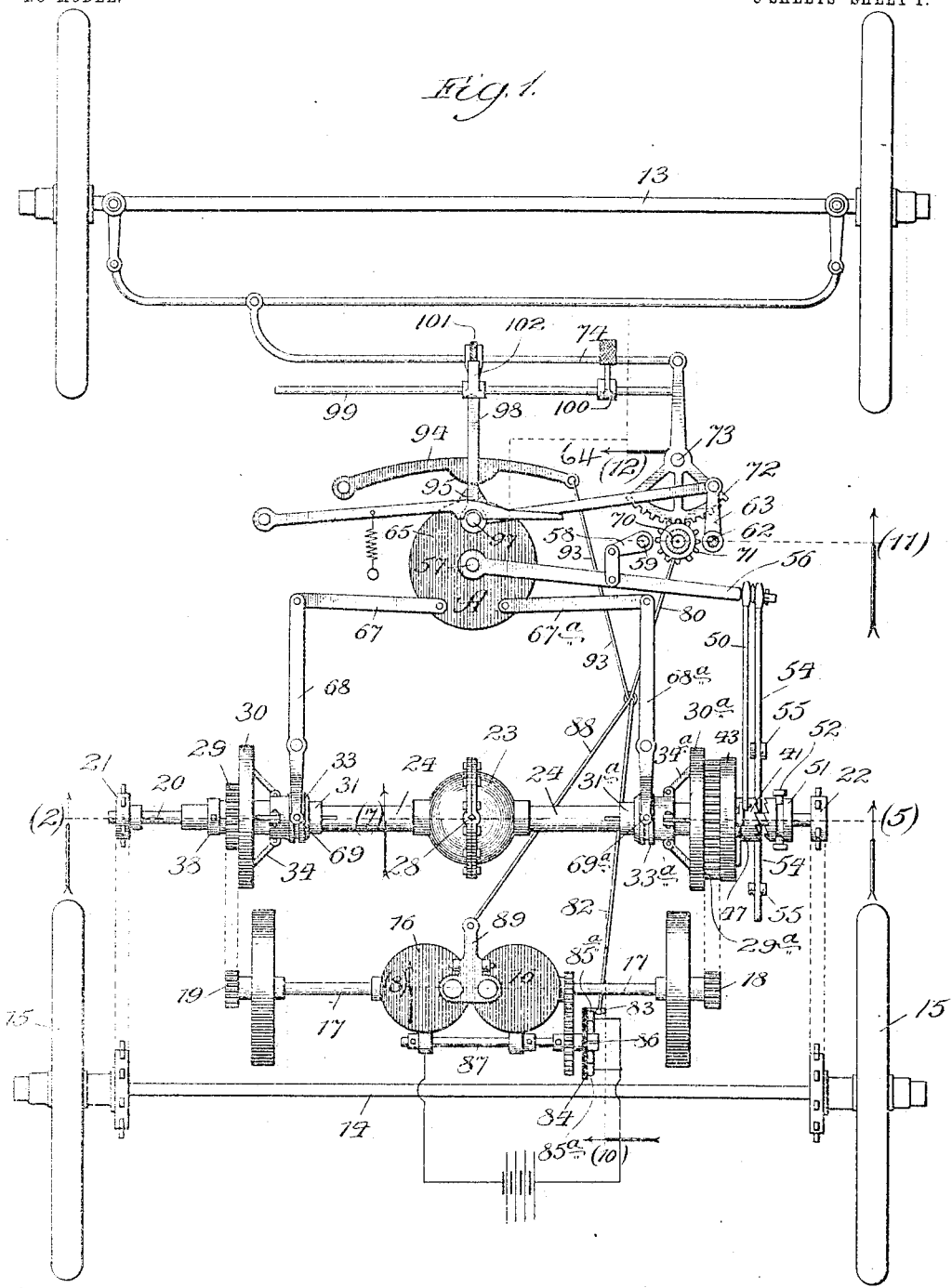

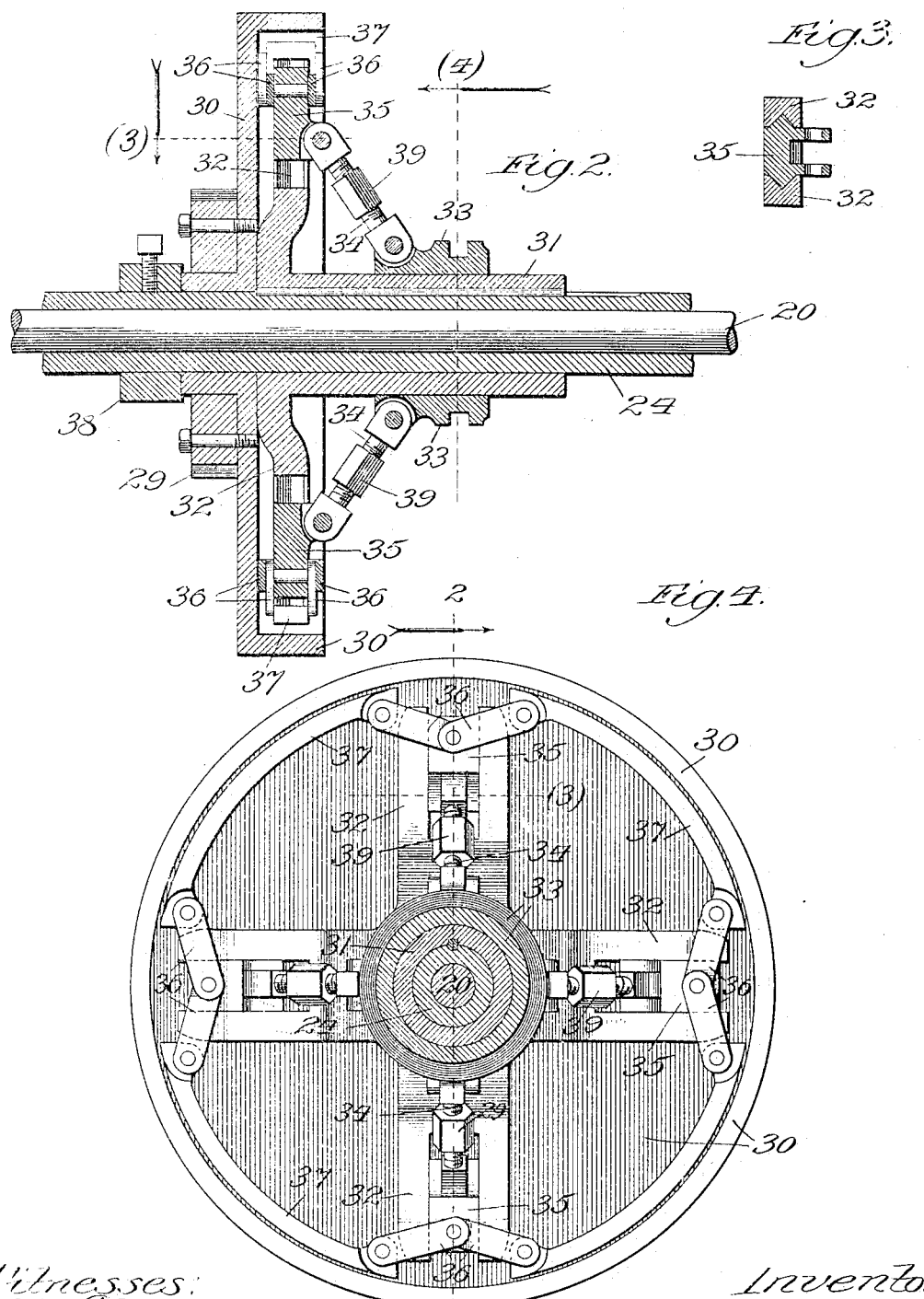

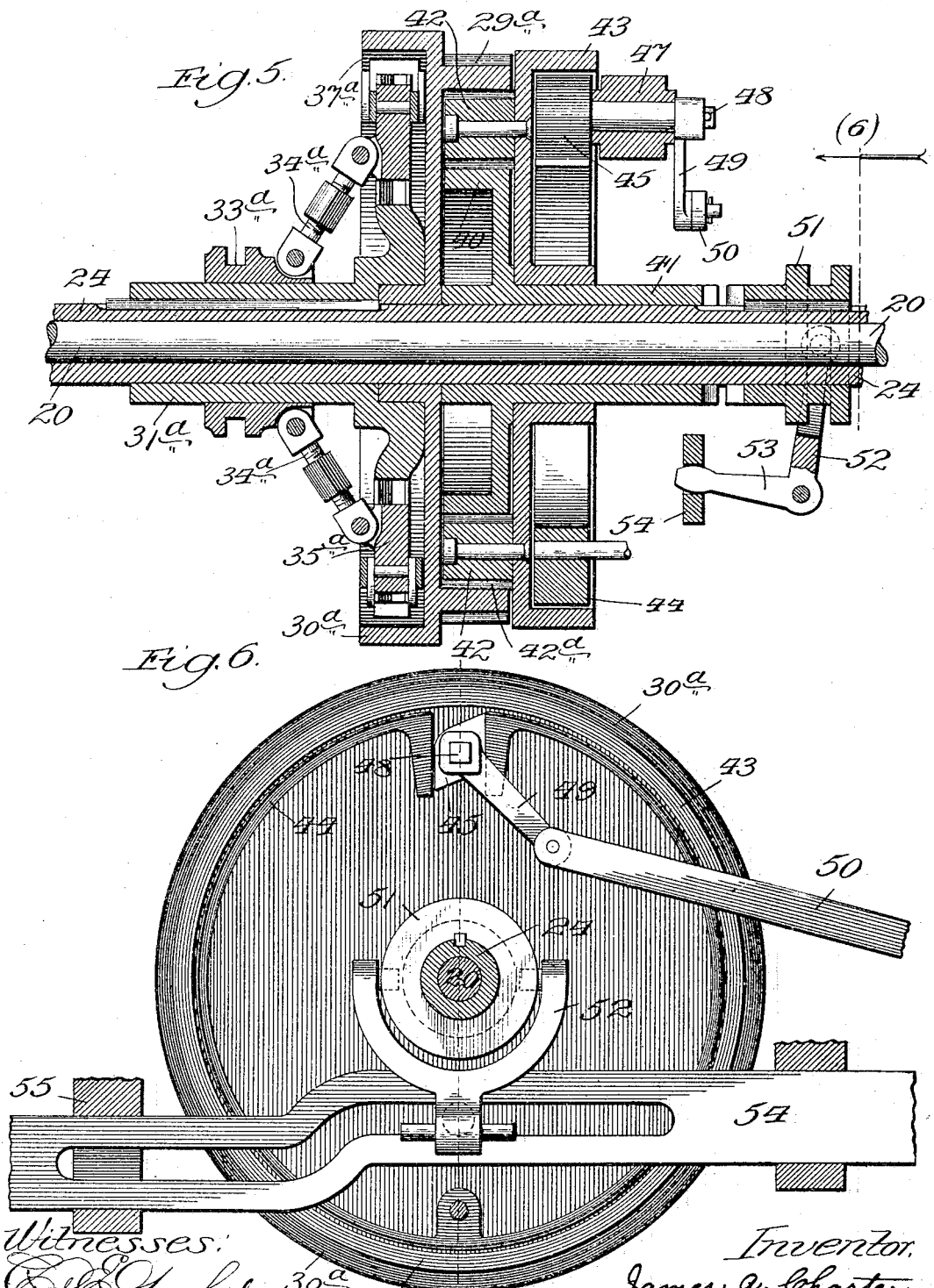

Witnesses:

Inventor:
James A. Charter
By Paul Synnestvedt
Atty.

No. 766,218. PATENTED AUG. 2, 1904.
J. A. CHARTER.
VEHICLE CONTROLLING MECHANISM.
APPLICATION FILED JUNE 18, 1903.
NO MODEL. 5 SHEETS—SHEET 5.

Witnesses:
Inventor,
James A. Charter
By Paul Synnestvedt
Att'y

No. 766,218. Patented August 2, 1904.

UNITED STATES PATENT OFFICE.

JAMES A. CHARTER, OF CHICAGO, ILLINOIS.

VEHICLE CONTROLLING MECHANISM.

SPECIFICATION forming part of Letters Patent No. 766,218, dated August 2, 1904.

Application filed June 18 1903. Serial No. 162,022. (No model.)

*To all whom it may concern:*

Be it known that I, JAMES ADAMS CHARTER, a citizen of the United States, residing at Chicago, in the State of Illinois, have invented certain new and useful Improvements in Vehicle Control Mechanism, of which the following is a specification.

My invention relates more especially to the style of self-propelled vehicles commonly known as "automobiles," and to means for operating and controlling the driving motor, the reversing gear and the brake system thereon. For convenience of illustration the apparatus is illustrated herein as applied to a road vehicle driven by an explosive engine. The objects of my invention are, To provide safety mechanism for throwing several speed gears into operation and for reversing the motion of the vehicle under each of the speeds;

To provide for automatically slowing down or stopping the engine upon the application of the brake for stopping the vehicles;

To provide safe-guards against a possible throwing of both speed gears into operation at once, and a superior system of clutches for operating the speed and reversing gears;

To provide safe-guards against applying the brake without throwing out, slowing up, or stopping the engine;

To provide superior means for throwing in the gears and for operating the brake; and to generally improve the construction and operation of the running gear control-mechanism of motor driven vehicles.

The above objects, together with other advantages which will hereinafter appear, I attain by means of the mechanism illustrated in preferred form in the accompanying drawings, wherein—

Figure 1 is a general plan view in outline of the running gear of the vehicle, and of my apparatus as applied thereto.

Figure 2 is a vertical longitudinal section through the clutch mechanism used for operating the gears; Figure 4 is an end elevation of the same, and a section on line 2 of Fig. 1.

Figure 3 is a section through part of the friction clutch device, taken on line 3 of Figure 4.

Figure 5 is a vertical central longitudinal section taken through one of the friction clutches and the reversing mechanism.

Figure 6 is a side elevation of the clutch and the reveasing gear mechanism of Figure 5, the section being taken on line 6 of Figure 5.

Power driven vehicles are generally provided with at least two different speed gears for running the vehicle forward, and with a reversing gear for running it backward at either one of said speeds. In case both of the speed gears should accidentally be thrown into operation at once there is great danger of breaking the mechanism, while this danger is greatly increased by the possibility in most apparatus of throwing the reversing gear into operation while one of the forward gears is still connected up. Another great difficulty experienced, especially in the use of vapor or steam motor cars is that when the vehicle is stopped and therefore the labor taken off the engine, the engine "races" or runs with increased speed due to taking off the load. It also frequently happens that the brakes are applied while the engine is still doing full duty to drive the vehicle forward and this results in injurious strains and danger to the working parts. The complicity of the parts and the multiplication of handles and levers to be attended to in such apparatus, is also an additional draw-back to the use of steam or vapor engines upon automobile vehicles. To avoid all of these difficulties and others, I arrange the apparatus shown as applied to a gasolene motor car in the accompanying drawings.

Figure 7:
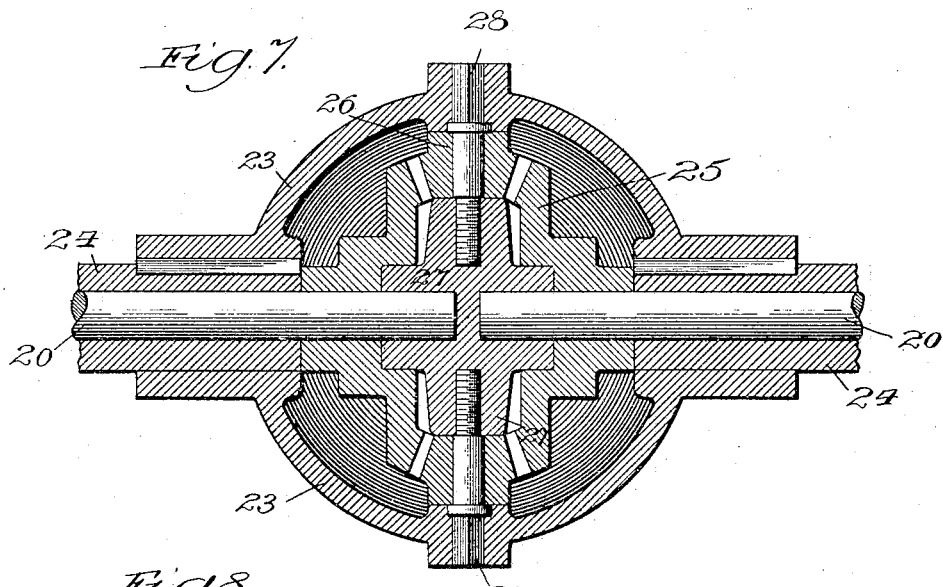
Figure 7 is a vertical central section through the differential gearing on the driving shaft.

The two axles 13, 14 and the wheels 15, shown in outline, may be mounted upon any desired frame-work, and upon any suitable support is mounted the engine cylinders 16, which drive a shaft 17, and through pinions 18 and 19 and flexible connections the pinions 29 and 29$^a$ on the driving shaft 20. The driving pinions 21 and 22 thereon are connected to drive the rear wheels of the vehicle as shown. The driving shaft 20 may be arranged with any suitable differential gear, such as that shown, in which the sleeve 24 mounted upon the shaft 20 rotates about the same differentially by means of the coöperating gears 25 and 26 connected in the block 27 on the spindles 28 and inclosed in the housing 24 as shown in Figure 7.

The gear or sprocket wheel 29 for driving the connections to the vehicle wheel is mounted loosely upon the sleeve 24, and to throw it into action I provide a clutch device which is composed of the spider 32 mounted on its sleeve 31 which is splined to the sleeve 24 and is provided with ring sections 37 which are designed to clutch upon the inside surface of the ring of the extension 30 attached to the wheel 29. The ring sections 37 of the clutch are thrown into engagement by means of the toggle links 36 which are thrust outwardly by means of the block 35 traveling in ways 32 which form the legs of the spider as shown in Figure 4. The thrust links 34 for operating the sliding blocks 35 may be provided with adjusting nuts 39, and at their inner ends they are pivoted to the sliding block 33 which has an annular groove ring for accommodation of the ends of the yoke 69 carried upon the lever 68. From this it will be seen that motion of the lever 68 and the yoke 69 will throw the sliding sleeve 33 in toward the spider and expand the friction clutch rings 38 so as to cause the pinion or sprocket wheel 29 to rotate with the sleeve 24 of the driving shaft.

On the other end of the driving shaft 20 and also on the sleeve 24 I may conveniently provide a second friction clutch gear 29$^a$, which is made of a different diameter from that of the other gear 29, in order to give a different speed. The construction and operation of the clutch for bringing into engagement this pinion 29$^a$ is exactly like that just heretofore described.

In order to provide for reversal of the motion of either of the speed gears, (see Figure 5), I use the freely rotating disk 43 which is provided on the side next the gear 29$^a$ with two or more "sun-and-planet" gear pinions 42 which mesh with inside gear 42$^a$ on the same ring with the gears 29$^a$, and also mesh with an inside sun gear 40, which is carried upon a sleeve 41 normally free to revolve upon the sleeve 24 of the driving shaft 20. A fixed bracket 47 carries an arbor 48 which is operated through a crank arm 49 and a link 50 as shown in Figure 6, and carries upon its end the double head cam 45, which it will be seen is so situated between the two ends of the divided friction clutch ring 44 that when the cam 45 is turned sidewise it pushes apart the ends of the ring 44 and causes it to clutch upon the inside surface of the ring 43 as will be plain from Figure 6. This clamping of the disk holds the two pinions 42 stationary and therefore causes the outside gear 42$^a$ to turn the gear 40 and the sleeve 41 in a direction opposite to the normal of the speed gear. The sleeve 41 is provided at its end with crown ratchet teeth which engage similar crown teeth upon the sliding sleeve 51, which is splined upon the sleeve 24 on the driving shaft 20, as will be seen from Figure 5. The sleeve 51 is operated to and from its place to engage with the crown ratchet on the sleeve 41 by means of the bell-crank lever 52 which is actuated through its arm 53 sliding in the cam slot in the bar 54, guided to move in a direct line by the fixed guides 55, and operated through the motion of the lever arm 56, as will be seen in Figure 1.

Figure 11:
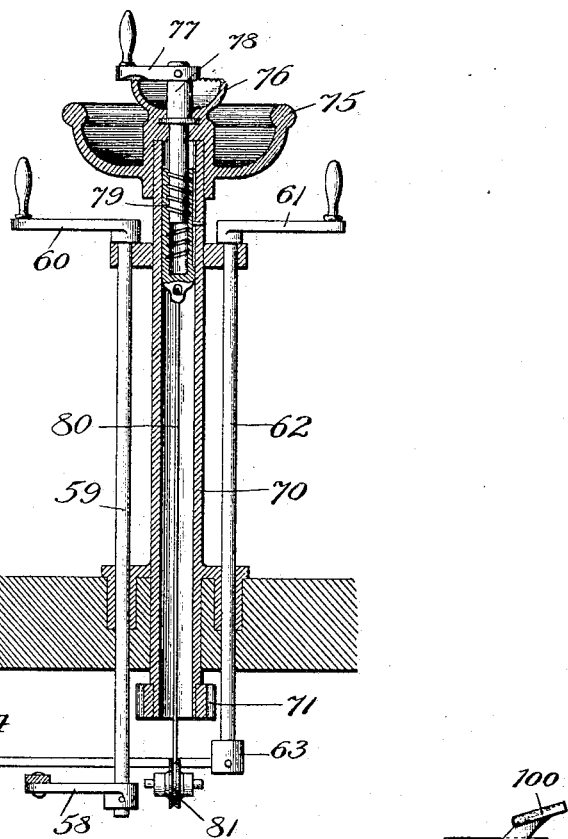
Figure 11 is a vertical central section through the operating handles for the brake and clutch mechanism.

Referring again to Figure 1, it will be seen that the levers 68 68$^a$ are attached by links 67 and 67$^a$ to pins upon the disk 65 which is mounted to oscillate on a shaft 57 and is actuated through the link 64 and the crank arm 63 fixed upon the shaft 62, which it will be seen from Figure 11 is attached to a handle 61 projecting above the floor of the vehicle in convenient place for the operator.

The lever 56 is also pivoted upon the shaft 57 and is operated through the link and crank arm 58, which latter is fixed upon the shaft 59 extending through the vehicle floor and provided at the top with a handle 60 as seen in Figure 11. It will be seen thus that the thrusting of the lever arm 64 to the right or to the left will operate the links 67 and 67$^a$ in opposite directions and therefore throw into operation either one of the friction clutches for the speed gears; but it is impossible to throw one of said clutches into engagement without first releasing the other, on account of the peculiar mounting of the lever arms.

Figures 8, 9, 10:
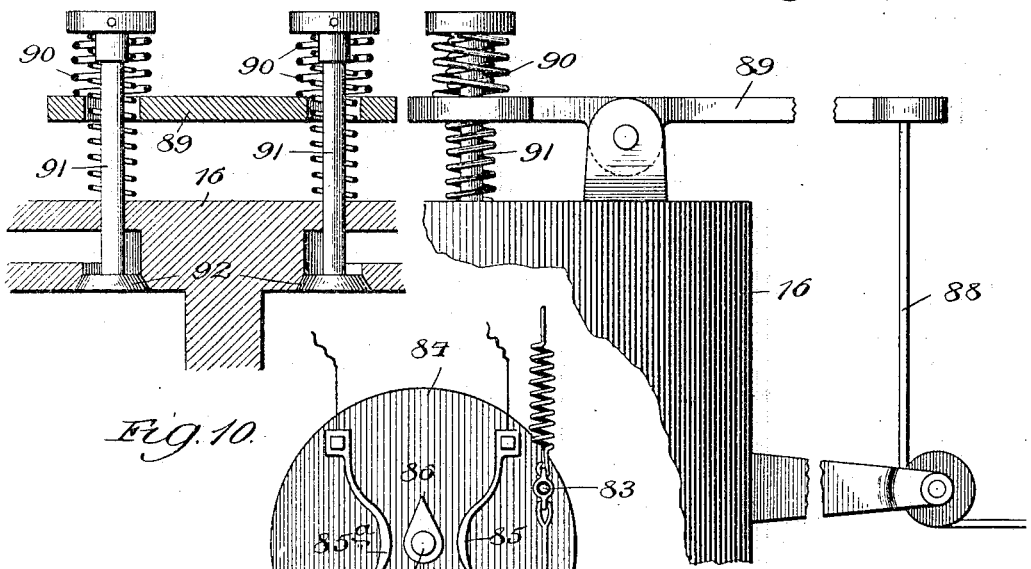
Figure 8 is a section showing the inlet valves of the gasolene engine.
Figure 9 is a side elevation of the same apparatus as Figure 8, showing the means for controlling the inlet valves of the engine.
Figure 10 is a partial view showing the sparking device and control therefor.

In order that the engine may be automatically cut-off or slowed down when the vehicle is stopped,—that is when the driving gears are thrown out of operation or the brake put on the vehicle, I provide upon the disk 65 a cam 95 which co-operates with the lever arm 94, pivoted at one end to a fixed support and at the other attached to controllers 93. The placing of the disk 65 in normal position, where either one or both of the feed clutches are thrown out of gear, will thus cause the cam 95 to pull upon the cord or chain 93, which is connected by the cords 88 and 82 respectively to means for regulating the inlet of the gas mixture and the sparker of the engine. From Figures 8 and 9, it will be seen that when a pull is made upon the cord 88 it rocks the lever 89 pivoted on some part of the cylinder casing, and introduces as an additional pressure against the inlet valve 92 the supplementary spring 90. This introduces an additional pressure to be overcome by the explosive mixture before admittance to the cylinders of the engines and thus reduces the amount of mixture to be exploded and therefore reduces the power of the engine. At the same time it will be seen that tension on the cord 82, which is attached by a pin 83 to the revolving disk 84 carrying fixed thereon the sparking contacts 85 and 85$^a$, will shift the phase of the sparker, causing the revolving cam contact 86 on shaft 87 to engage contact 85 at a later period and therefore bring about the explosion in the cylinder at a later time, which gives a shorter stroke of the piston and therefore again reduces the driving power of the same, or in extreme cases may entirely shut it off.

This much of the operation is automatic and incidental to the regular manipulation. In order to provide for directly shutting off the engine or slowing it down as may be desired by the same means as just heretofore described, it will be seen from Figure 11 that the flexible connection 80, which is attached to the cords 82 and 83 heretofore described, is carried up through the central tube 70 of the controller and is attached to a movable block 79 which is operated to move vertically by means of the screw-shaft 78 upon the handle 17 and may be set at any desired point upon the notched ring 76 of the controller, as will be seen from Figure 11.

Figure 12:
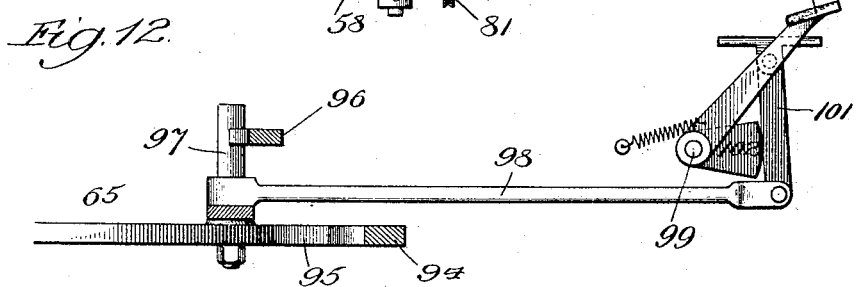
Figure 12 is a partial detail view showing the mounting of the foot brake and the safety appliance thereon.

In order that the gearing may not be thrown out of operation or the brake put on to stop the vehicle without also shutting or slowing down the engine, or the brake put on without releasing the forward driving gear, I have provided, as shown in Figure 12, upon the foot brake lever 100, pivoted upon the shaft 99, a cam 102 which when the brake is put on co-operates with a swinging link 101 and through the link 98 draws the pivot pin 97 forward to its normal position with the cam 95 in position to co-operate with the lever 94 and induce the tension upon the cords 88, 82 as heretofore described, and at the same time place the levers 68 and 68$^a$ in normal position so that both of the friction clutches are thrown out of engagement.

From the above description it will be seen that the apparatus is so designed that it will be impossible by even the most careless handling to throw both of the speed clutches in at the same time, or to put on the brake to stop the vehicle without also throwing out of gear the forward speed clutches, or to put on the brake without also slowing down or entirely stopping the engine. The application of the friction clutches insures against breakage and the engine control makes it possible to use various different speeds by means of but two differential speed drivers 29 and 29$^a$; at the same time the operation of the speed and reversing gears does not interfere in any respect with the working of the differential gearing between the two wheels. The entire set of operating handles for running the venicle is grouped together in one place around the standard 70 which carries the handle 75 operating the pinion 71 and the rack 72, which as will be understood is carried on pin 73, and through the link 74 operates the steering mechanism of the vehicle. The different speeds are brought into operation by moving the handle 61 to the right or left, while the reversing gear is operated by the handle 60, and the direct control of the engine is manipulated by the handle 77.

While the apparatus is illustrated as applied to a vehicle propelled by an explosive engine, it will be evident that it may be applied equally well to any other form of engine or to an electric motor, as the connections 82 and 88 may regulate and control the brushes upon an electric motor and the resistance coils thereof as well as an engine, while the rest of the mechanism would be the same with any kind of motor for propelling the vehicle.

The many advantages of the various devices will readily occur to those familiar with the art.

Having thus described my invention and illustrated its use, what I claim, and desire to secure by Letters Patent, is the following:

1. In vehicle driving mechanism the combination of a motor, a braking device, a gear clutch mechanism, and a supplementary mechanism attached to the gear and the brake operating mechanisms, and means connected thereto to reduce the power of the motor automatically when the gearing is thrown out, when the gearing is reversed, and when the brake mechanism is applied.

2. In a motor driven vehicle the combination with driving clutch mechanism, of supplementary automatic means for reducing the speed of the motor, said means operated directly by the clutch mechanism when the latter is set in neutral position and also when it is reversed, substantially as described.

3. The combination with a motor and vehicle brake mechanism, of a friction gear clutch mechanism for the motor, means connected to the motor and positively operated by the clutch when the clutch is released, and also positively operated by the brake mechanism when it is set in operative position, by which the engine is automatically cut off when either the brake is applied or the clutch is released, substantially as described.

4. In vehicle driving mechanism the combination with an explosive engine and vehicle brake lever mechanism, of means operated by the brake lever for cutting off the explosive charge and for retarding the phase of the explosion in said engine.

5. In vehicle driving mechanism the combination with an explosive engine and gear clutch mechanism, of means operated by the clutch mechanism for cutting off the explosive charge and for retarding the phase of the explosion in said engine.

6. In vehicle driving mechanism the combination of a motor, a countershaft, two speed gears on the countershaft having engaging clutches, levers operating said clutches, a rocker member actuating said levers, means to reduce speed of the motor and a cam on said rocker member operating the speed reducing means automatically when said rocker is in neutral position to release both clutches.

7. In vehicle driving mechanism the combination with brake mechanism and a plurality of speed gears, of friction clutches for controlling each of the gears, lever arms for operating the clutches, an oscillating member moving said levers simultaneously to throw one clutch into operation and the other out of operation, and automatic means actuated by the brake lever for returning said member to neutral position.

8. In vehicle driving mechanism the combination with a pair of speed gear clutches, of lever mechanism for throwing said clutches alternately into operation, a reciprocating member operating said levers simultaneously to throw one of said clutches into operation and the other out of operation, a brake lever, a link connecting the brake lever with said clutch-operating member, and adapted to return the same to neutral position for the clutches upon the actuation of the brake lever.

9. The combination with a driving shaft, of an idle gear thereon, a friction clutch for causing said gear to rotate with the shaft, a disk loosely mounted upon said shaft and provided with pinions directly engaging the idler gear, means for holding said disk stationary, on the idle gear wheel.

10. The combination with a driving gear loosely mounted upon a shaft, friction clutch means for engaging the said gear with the said shaft, a sun-and-planet gear engaging said driving gear, and an inner driven gear mounted freely upon said shaft to engage the planet pinions, and a splined collar upon said shaft provided with crown ratchet teeth to engage the hub of the loose driven gear, and means to move said collar into engagement, substantially as described.

11. In vehicle driving mechanism, the combination with a brake lever, an explosive engine and an inlet valve therefor, of a supplementary spring for inducing pressure on said valve, and means automatically operated by the application of the vehicle brake to induce pressure upon said spring, to reduce the volume of explosive mixture admitted to the engine.

In testimony whereof I have hereunto signed my name in the presence of the two subscribed witnesses.

JAMES A. CHARTER.

Witnesses:
PAUL CARPENTER,
EDWARD C. BURNS.